Nov. 16, 1943.     R. A. KOELLER     2,334,415
HITCH FOR CORN-BINDERS AND HAY-RACKS
Filed April 5, 1943     2 Sheets-Sheet 1

Inventor:
Reuben A. Koeller
By McCanna, Wintercorn
& Morsbach Attys.

Nov. 16, 1943.    R. A. KOELLER    2,334,415
HITCH FOR CORN-BINDERS AND HAY-RACKS
Filed April 5, 1943    2 Sheets-Sheet 2
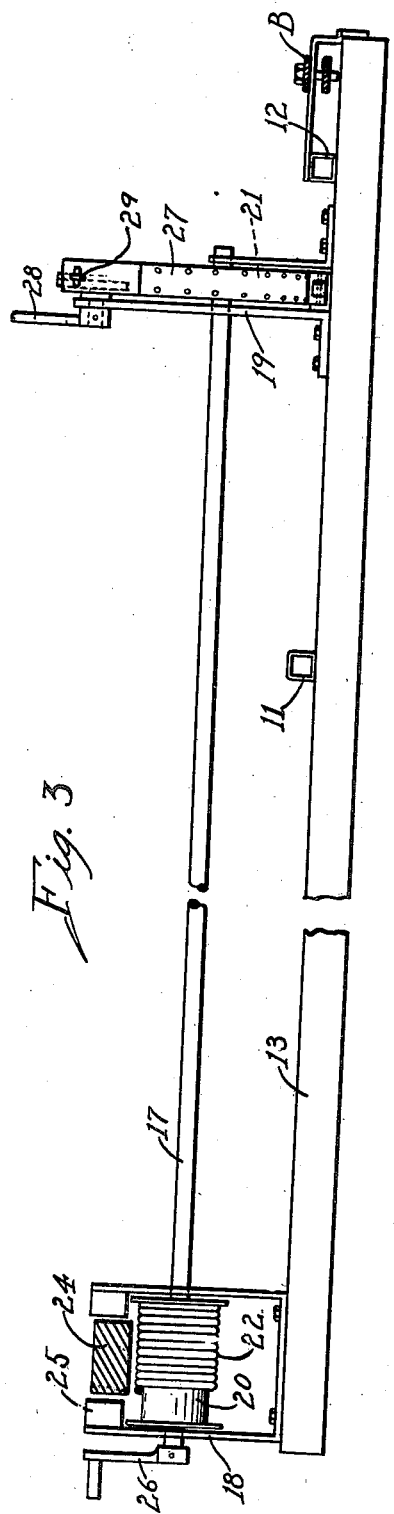
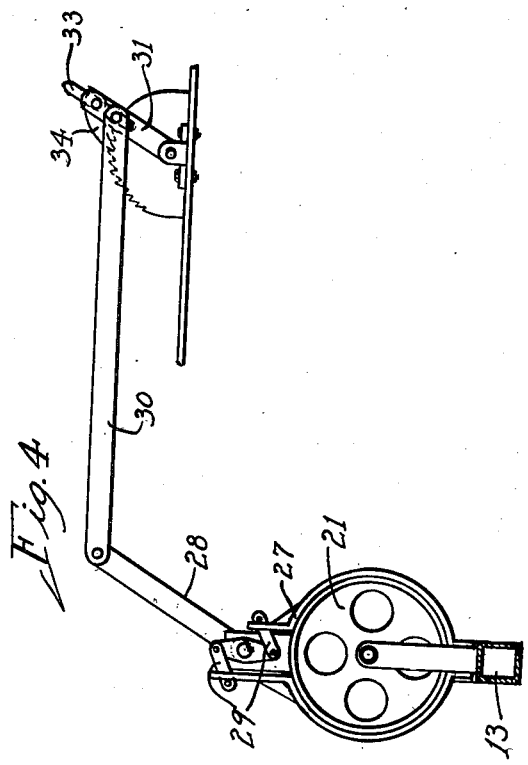
Inventor.
Reuben A. Koeller
By McCanna, Wintercorn
& Morsbach Attys.

Patented Nov. 16, 1943

2,334,415

UNITED STATES PATENT OFFICE 2,334,415

HITCH FOR CORN BINDERS AND HAYRACKS

Reuben A. Koeller, Genoa, Ill.

Application April 5, 1943, Serial No. 481,854

11 Claims. (Cl. 280—33.44)

This invention relates to an improved hitch for a corn-binder and hay-rack.

The principal object of my invention is to provide a simple and economical hitch device that is easily attachable to a tractor, to permit the pulling of the binder and hay-rack together alongside one another, and permit adjustment of the hay-rack rearwardly in relation to the binder as it is loaded with bundles, by means of a simple pedal control on the tractor, whereby to avoid the necessity for an extra man driving a team of horses pulling a hay-rack and also obviate much of the difficulty going with that kind of operation, where the man on the hay-rack is not experienced and does not keep the hay-rack in proper relation to the binder for the efficient loading of bundles.

A salient feature of the hitch of my invention is the provision on a single shaft of a drum on which the rope for pulling the hay-rack is wound, and a brake drum cooperating with a brake band operable by foot pedal control from the tractor, so that the shaft is normally held against turning except when the brake is released by the operator to allow the hay-rack to back up in relation to the binder in the loading of the hay-rack.

Another important feature of the present hitch is the provision of a hand crank on the outer end of the shaft adjacent the rope drum for convenient preliminary adjustment of the hitch at the start.

The invention is illustrated in the accompanying drawings, in which—

Fig. 3 is a rear view of the supporting boom of the hitch showing the rope drum and brake drum and the relationship of the rope drum to the tongue of the hay-rack, and Fig. 4 is a sectional detail on the line 4—4 of Fig. 1.

The same reference numerals are applied to corresponding parts in these four views.

Figure 1:
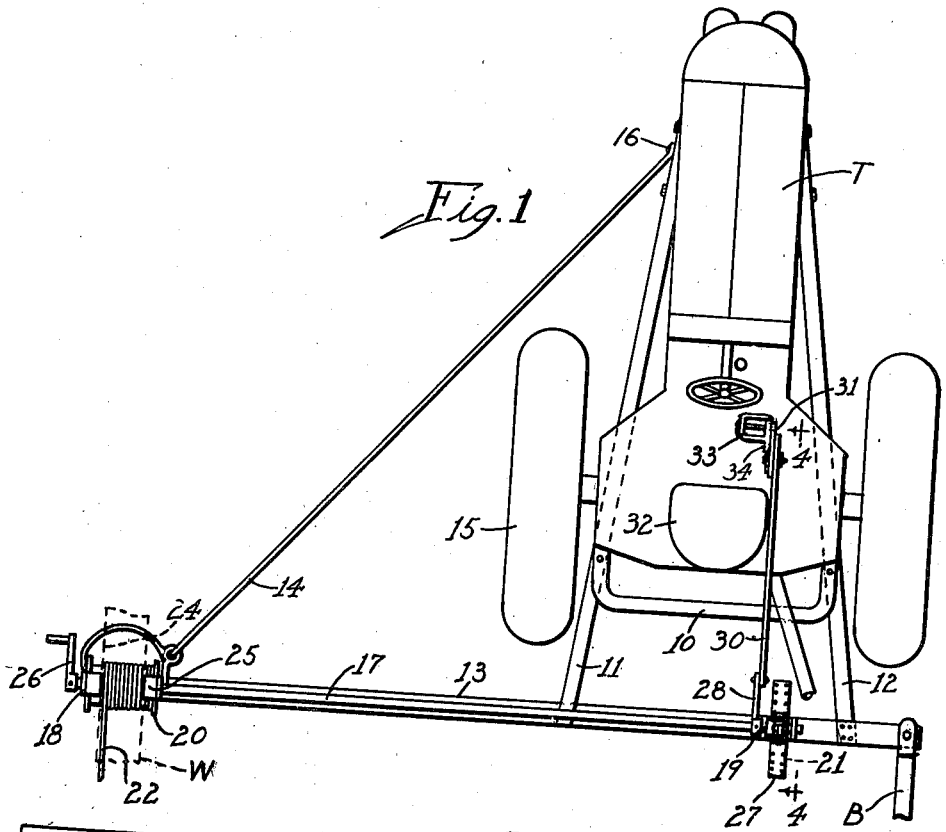
Fig. 1 is a plan view of a tractor showing a hitch constructed in accordance with my invention applied thereto.
Figure 2:
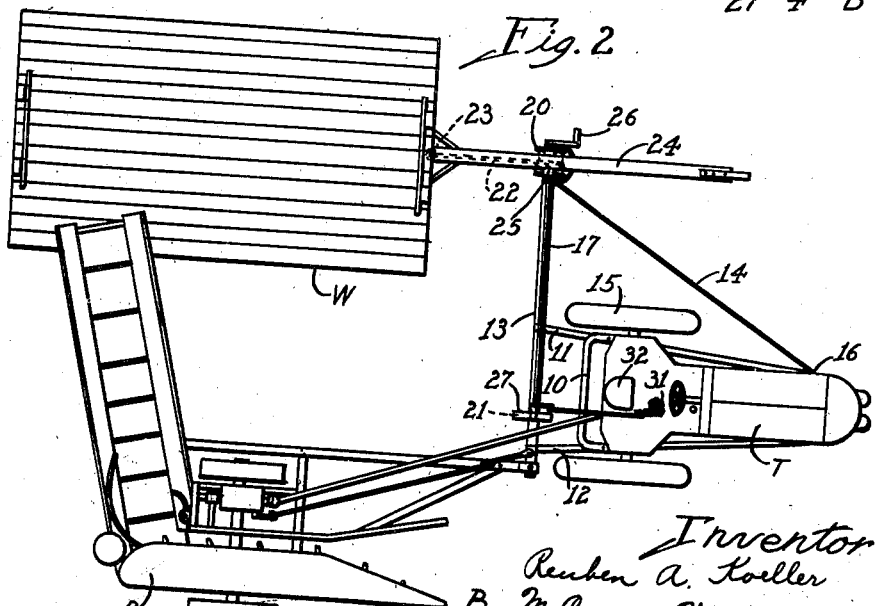
Fig. 2 is a plan view on a smaller scale showing the relationship of the hitch to the binder and hay-rack.

The hitch of my invention is herein disclosed as used in connection with a corn-binder B and hay-rack W, it being particularly adapted for that use. However, the invention should not be regarded as limited to that specific application, inasmuch as it may, with little or no change, be used with a corn-picker and its wagon, and wherever a similar problem is presented of periodically changing the fore and aft relationship of one of two trailing vehicles to the other where the vehicles travel in parallel. While the invention was conceived with relation to the agricultural implement field, it should be obvious that other uses will doubtlessly be found for it in other fields, wherever a similar problem is presented.

Referring to the drawings, the tractor T has applied to its frame 10 an adapter frame for the hitch consisting of longitudinally extending beams 11 and 12 disposed on opposite sides of the tractor. 13 is a transverse boom carried on the rear end portions of the beams 11 and 12 and braced at its outer end by a diagonally extending rod 14, which extends past the front of the left wheel 15 of the tractor and is secured, as at 16, to the front end of the beam 11. A shaft 17 is mounted in two pairs of bearings 18 and 19 on the boom 13 and has a rope drum 20 suitably fixed on the outer end portion between the bearings 18 and a brake drum 21 suitably fixed on the inner end portion between the bearings 19. A rope or cable 22 suitably fixed to the drum 20 and wound thereon extends rearwardly from the drum for connection, as at 23, to the wagon W. The tongue 24 of the wagon extends between guide projections 25 provided on the upper ends of the bearings 18 above the drum 20. A hand crank 26 is secured on the projecting outer end portion of the shaft 17 and is used in winding the rope or cable on the drum 20 in the preliminary adjustment of the hay-rack W in relation to the corn-binder B. As will soon appear, the shaft 17, which is normally held against turning, is released periodically long enough to allow the hay-rack W to drop back a foot or two in relation to the binder when the bundles delivered from the elevator of the binder are piled high enough to make such a change in the relationship of the hay-rack and binder advisable. As will also soon appear, the driver of the tractor, who can easily watch the loading of the hay-rack, makes the adjustment from time to time and in that way the gathering and binding of the corn stalks can all be taken care of by one man instead of requiring another man driving a team pulling the hay-rack. It has been found that unless the man on the hay-rack is experienced and skilled in keeping the hay-rack in the correct relationship to the binder at all times, there is entirely too much confusion and loss of time and generally reduced efficiency, which can all be eliminated with a hitch operating in accordance with my invention.

The brake drum 21 has a brake band 27 cooperating therewith and mounted on one of the bearings 19. An arm 28 pivoted on the bearing 19 is operatively connected with both ends of the brake band 27, on opposite sides of its pivot, as indicated at 29, to positively apply or positively release the band. A line 30 is pivoted to and extends forwardly from the arm 28 to a control pedal 31 in front of the driver's seat 32 on the tractor. A suitable ratchet lock is provided in connection with the pivoted pedal treadle 33 to lock the pedal releasably in any adjusted position. The driver merely tilts the treadle 33 as he depresses the pedal 31 to apply the brake band 27 and the pedal then remains locked until manually released by tilting the treadle in the opposite direction to disengage the tooth 34 thereon from the ratchet and pulling back on the treadle with the toe portion of the shoe engaging the forward side of the treadle. In that way the driver can allow the hay-rack to drop back just as little or as far as he considers necessary and can instantly stop the drum 21 by application of the band 27 to hold the hay-rack in a given adjusted relationship to the binder. The positive release of the brake is an important feature, because it avoids any drag interfering with the easy turning of the shaft 17 when the rope drum has to turn to allow the hay-rack to drop back.

It should be clear from the foregoing description that I have provided a hitch of unusually simple and economical construction and one which may be applied easily to any tractor and operated by persons having only average mechanical skill. I have avoided the complications found in most other hitches and have provided a hitch which is thoroughly practical and greatly facilitates the work of the farmer.

It is believed the foregoing description conveys a good understanding of the objects and advantages of my invention. The appended claims have been drawn to cover all legitimate modifications and adaptations.

I claim:

1. A hitch for use between a tractor and an agricultural implement and a wagon running alongside the latter, comprising means connecting the implement with the tractor, a boom carried by the tractor and extending laterally therefrom in front of the wagon, a shaft mounted in bearings on said boom and extending lengthwise thereof, a rope drum fixed on the outer end portion of said shaft in front of the wagon, a rope attached to and wound on the drum and extending rearwardly to and connected with the wagon, a brake drum fixed on the inner end portion of said shaft adjacent the tractor, a brake band for gripping said drum, and manually operable means controllable from the tractor for releasing and applying said band.

2. A hitch as set forth in claim 1, including a hand crank for one end of said shaft for turning the shaft to wind the rope on the first mentioned drum in preliminarily adjusting the wagon in relation to the implement.

3. A hitch as set forth in claim 1, including a guide on the outer end portion of said boom for slidably guiding the tongue of the wagon.

4. A hitch for use between a tractor and an agricultural implement and a wagon running alongside the latter, comprising means connecting the implement with the tractor, a boom carried by the tractor and extending laterally therefrom in front of the wagon, a shaft mounted in bearings on said boom and extending lengthwise thereof, a rope drum fixed on the outer end portion of said shaft in front of the wagon, a rope attached to and wound on the drum and extending rearwardly to and connected with the wagon, a brake drum fixed on the inner end portion of said shaft adjacent the tractor, a brake band for gripping said drum, manually operable means controllable from the tractor for releasing and applying said band, and means for attaching the boom to the frame of a tractor, comprising a pair of beams for attachment to the frame on opposite sides of the tractor disposed in laterally spaced relation to one another and in transverse relation to the boom and secured at their rear ends to said boom on approximately one half-portion thereof, and a brace rod secured at one end to the remote end portion of the boom and extending diagonally with respect to the boom and the adjacent beam and secured at its other end portion to the front end portion of said adjacent beam in forwardly spaced relation to a drive wheel of the tractor.

5. A device as set forth in claim 4, including a hand crank for one end of said shaft for turning the shaft to wind the rope on the first mentioned drum in the preliminary adjustment of the wagon in relation to the boom.

6. In a device of the class described, a hitch boom, a pair of laterally spaced bearings on the boom and another bearing on the boom in longitudinally spaced relation thereto, a shaft rotatably supported on said boom in said bearings, a rope drum fixed on said shaft between the said pair of bearings, guide means on the latter bearings for slidably guiding the tongue of a wagon relative to the rope drum when a rope wound on the drum is connected to the wagon, a brake drum fixed on said shaft adjacent the other bearing, and a brake band encircling the drum and supported on said bearing and having means for applying and releasing the same.

7. A device as set forth in claim 6, including a hand crank for one end of said shaft for turning the shaft to wind the rope on the first mentioned drum in the preliminary adjustment of the wagon in relation to the boom.

8. In a device of the class described, a hitch boom, a pair of laterally spaced bearings on the boom and another bearing on the boom in longitudinally spaced relation thereto, a shaft rotatably supported on said boom in said bearings, a rope drum fixed on said shaft between the said pair of bearings, guide means on the latter bearings for slidably guiding the tongue of a wagon relative to the rope drum when a rope wound on the drum is connected to the wagon, a brake drum fixed on said shaft adjacent the other bearing, a brake band encircling the drum and supported on said bearing and having means for applying and releasing the same, and means for attaching the boom to the frame of a tractor, comprising a pair of beams for attachment to the frame on opposite sides of the tractor disposed in laterally spaced relation to one another and in transverse relation to the boom and secured at their rear ends to said boom on approximately one half-portion thereof, and a brace rod secured at one end to the remote end portion of the boom and extending diagonally with respect to the boom and the adjacent beam and secured at its other end portion to the front end portion of said adjacent beam in forwardly spaced relation to a drive wheel of the tractor.

9. A device as set forth in claim 8, including a hand crank for one end of said shaft for turning the shaft to wind the rope on the first mentioned drum in the preliminary adjustment of the wagon in relation to the boom.

10. A hitch for use between a tractor and an agricultural implement and a wagon running alongside the latter, comprising means connecting the implement with the tractor, a boom carried by the tractor and extending laterally therefrom in front of the wagon, a shaft mounted in bearings on said boom and extending lengthwise thereof, a rope drum fixed on the outer end portion of said shaft in front of the wagon, a rope attached to and wound on the drum and extending rearwardly to and connected with the wagon, a brake drum fixed on the inner end portion of said shaft adjacent the tractor, a brake band for gripping said drum, said band having free end portions adapted to be drawn toward one another to grip the drum, and vice versa, and a manually operable lever pivoted relative to said boom between the end portions of said band and connected on opposite sides of the pivot to said end portions to positively apply and positively release the band.

11. A hitch for use between a tractor and an agricultural implement and a wagon running alongside the latter, comprising means connecting the implement with the tractor, a boom carried by the tractor and extending laterally therefrom in front of the wagon, a shaft mounted in bearings on said boom and extending lengthwise thereof, a rope drum fixed on the outer end portion of said shaft in front of the wagon, a rope attached to and wound on the drum and extending rearwardly to and connected with the wagon, a brake drum fixed on the inner end portion of said shaft adjacent the tractor, a brake band for gripping said drum, a manually operable pedal on the tractor operatively connected with said band to apply and release the same, a ratchet for locking the pedal, and a treadle tiltably pivoted on the pedal and having a tooth to engage the ratchet when the treadle is tilted in one direction to lock the pedal in an adjusted position relative to the ratchet.

REUBEN A. KOELLER.